United States Patent [19]

Kii et al.

[11] Patent Number: 5,090,727
[45] Date of Patent: Feb. 25, 1992

[54] SUSPENSION CONTROL SYSTEM WITH VEHICULAR DRIVING CONDITION DEPENDENT HEIGHT ADJUSTMENT

[75] Inventors: Katsuya Kii, Nara; Yuji Okuyama; Kazuo Mori, both of Tochigi, all of Japan

[73] Assignee: Nissan Motor Company, Limited, Japan

[21] Appl. No.: 576,585

[22] Filed: Sep. 4, 1990

[30] Foreign Application Priority Data

Sep. 4, 1989 [JP] Japan .................................. 1-228809
Sep. 4, 1989 [JP] Japan .................................. 1-228811

[51] Int. Cl.⁵ .................................................. B60G 11/26
[52] U.S. Cl. ......................................... 280/707; 280/714; 280/840
[58] Field of Search ............... 280/707, 711, 714, 840

[56] References Cited

U.S. PATENT DOCUMENTS

| | | | |
|---|---|---|---|
| 4,568,101 | 2/1986 | Bleustein et al. | 280/707 |
| 4,685,689 | 8/1987 | Takizawa et al. | 280/707 |
| 4,743,000 | 5/1988 | Karnopp | 280/707 |
| 4,856,813 | 8/1989 | Tanaka et al. | 280/707 |
| 4,965,878 | 10/1990 | Yamagiwa et al. | 280/707 |
| 4,966,390 | 10/1990 | Lund et al. | 280/707 |

FOREIGN PATENT DOCUMENTS

| | | |
|---|---|---|
| 0249209 | 6/1947 | European Pat. Off. |
| 0249227 | 6/1947 | European Pat. Off. |
| 0249246 | 12/1987 | European Pat. Off. |
| 0285153 | 3/1988 | European Pat. Off. |
| 0286072 | 4/1988 | European Pat. Off. |
| 0315458 | 5/1989 | European Pat. Off. |
| 2101610 | 1/1971 | Fed. Rep. of Germany |
| 2565169 | 12/1985 | France |
| 62-037209 | 2/1987 | Japan |
| 62-293167 | 12/1987 | Japan |
| 62-295714 | 12/1987 | Japan |
| 63-235112 | 9/1988 | Japan |

*Primary Examiner*—Kenneth R. Rice
*Attorney, Agent, or Firm*—Lowe, Price, LeBlanc & Becker

[57] ABSTRACT

A suspension control system includes a plurality of suspension systems respectively disposed between a vehicular body and each road wheel thereof, the suspension systems having variable damping characteristics. Each suspension system is associated with means for adjusting damping characteristics according to a suspension control command. Each suspension control system also includes a sensor means for monitoring an inertia force exerted on the vehicular body, which inertia force affects for vehicular attitude to cause a vehicular attitude change. A control unit receives the output of the sensor means and derives a suspension control command for regulating vehicular height and vehicular attitude. The control unit is designed to detect a predetermined particular vehicle driving condition on the basis of the sensor output for deriving the suspension control command for adjusting vehicular height to a lower level than a normal height level.

16 Claims, 9 Drawing Sheets

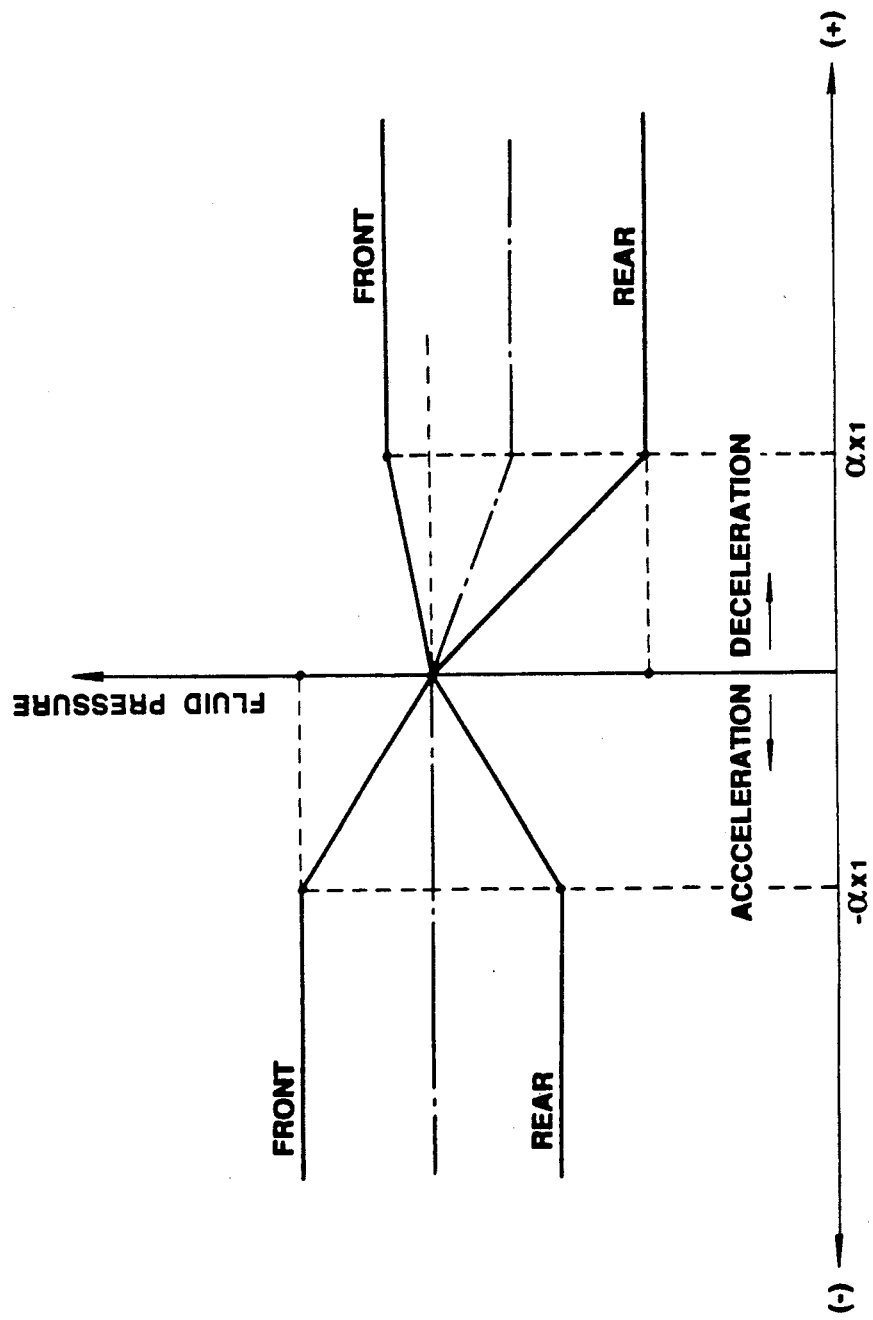

SUSPENSION CONTROL SYSTEM WITH VEHICULAR DRIVING CONDITION DEPENDENT HEIGHT ADJUSTMENT

BACKGROUND OF THE INVENTION

1. Field of the Invention

The present invention relates generally to a suspension control system for controlling vehicular suspension characteristics for achieving both the riding comfort and driving stability. More specifically, the invention relates to a suspension control system, particularly applicable for an active suspension system, which suspension control system performs height adjustment for assuring vehicular driving stability at particular vehicle driving condition inducing inertia forces affecting vehicular attitude.

2. Description of the Background Art

In the modern automotive technologies, active suspension systems have been introduced for better vehicular height and vehicular attitude regulating potential. Such recently developed or proposed active suspension systems generally perform vehicular height regulation and vehicular attitude regulation, e.g. anti-pitching and anti-rolling control.

Japanese Patent First (unexamined) Publications (Tokkai) Showa 62-295714 and 63-235112 disclose typical constructions of active suspension systems. The active suspension system disclosed in the former publication is designed to perform anti-rolling suspension control on the basis of lateral acceleration exerted on the vehicular body. The shown system adjusts fluid pressure in working chambers in a hydraulic cylinder for adjusting a damping force resisting against rolling moment and whereby suppressing vehicular rolling. On the other hand, the latter publication discloses an active suspension system which performs anti-pitching control on the basis of longitudinal acceleration exerted on the vehicular body. The system also adjusts the fluid pressures in the working chambers in the hydraulic cylinders so as to suppress vehicular pitching motion. The latter publication further discloses use of variable gains for controlling front and rear suspension systems, with which gains the longitudinal acceleration indicative signal is amplified to derive front and rear suspension control commands. The variable gain provided in the later publication is expected to provided higher precision and optimum suspension control performance.

In such prior proposed active suspension systems, the fluid pressure in the working chamber is maintained at a predetermined neutral pressure as long as the lateral and/or longitudinal acceleration exerted on the vehicular body is maintained at zero. When the vehicle rolls, the fluid pressures at left and right suspension systems are adjusted by left and right suspension control commands having equal values but having opposite phases or polarities for hardening suspension systems oriented outside of the curve and softening suspension oriented inside of the curve. Similarly, when vehicular pitching is caused, front and rear suspension control commands having equal valve but opposite phases are supplied to the front and rear suspension system for suppressing vehicular pitching motion magnitude.

Theses prior proposed active suspension systems are effective for regulating the vehicular height level substantially at a target height or within a predetermined target height range set about the target height and for regulating vehicular attitude. On the other hand, vehicular driver expect a vehicular attitude change causing lowering of vehicular height at one side of the vehicular body during acceleration, deceleration and cornering. Furthermore, the drivers may feel higher stability if the vehicular height is lowered when inertia force causing vehicular rolling and/or pitching is exerted on the vehicular body. In contrast to this, the active suspension system normally adjusts the vehicular height at least within the target height range even when an inertia force in the longitudinal or lateral direction is exerted. Therefore, despite the fact that the vehicular driving stability is assured by adjustment of suspension characteristics at each of individual suspension systems, the drivers might feel that the vehicular height is excessively high and may bring instability of the vehicle. This may degrade the drive feeling of the vehicle.

SUMMARY OF THE INVENTION

Therefore, it is an object of the present invention to provide a suspension control system which can improves vehicular behavior in response to an inertia force for better drive feeling.

In order to accomplish the aforementioned and other objects, a suspension control system, according to the present invention, includes a suspension system which is disposed between a vehicular body and each road wheel and variable of damping characteristics. The suspension system is associated with means for adjusting damping characteristics according to a suspension control command. The suspension control system also includes a sensor means for monitoring an inertia force exerted on the vehicular body, which inertia force affects vehicular attitude to cause attitude change. A control unit receives the output of the sensor means for deriving the suspension control command for regulating the vehicular height and vehicular attitude. The control unit is designed to detect a predetermined particular vehicle driving condition on the basis of the sensor output for deriving the suspension control command for adjusting vehicular height lower level than a normal height level.

According to one aspect of the invention, a suspension control system for an automotive vehicle comprises:

a plurality of suspension systems, each disposed between a vehicular body and a road wheel for damping relative displacement therebetween;

damping characteristics adjusting means associated with each suspension system for controlling damping characteristics of the suspension system according to a suspension control command;

sensor means for monitoring an inertia force acting on the vehicular body and affecting a vehicular attitude, said sensor means producing a sensor signal representative of the monitored inertia force; and control means for performing a control operation on the basis of said sensor signal by deriving said suspension control command for regulating vehicular height within a predetermined standard height range and regulating vehicular attitude, said control means detecting a predetermined particular vehicle driving condition on the basis of said sensor signal for switching control mode for adjusting the vehicular height at a level lower than said standard height range with a controlled magnitude of vehicular attitude change.

Preferably, the control means derives a hardening suspension control command for suspension system at which relative displacement between said vehicular body and said road wheel is caused for reducting the relative distance between, and a softening suspension control command for suspension systems at which relative displacement between said vehicular body and said road wheel is caused for increasing the relative distance therebetween, said control means being responsive to said particular vehicle driving condition to reducing hardening magnitude for said hardening suspension control command and increasing softening magnitude for said softening suspension control command. In such case, it is preferred that the control means performs anti-pitching suspension control for lowering the vehicular height in response to longitudinally exerted inertia force. The control means is responsive to a backward inertial force exerted on the vehicular body for lowering the vehicular height below said standard height range.

In the alternative, the control means performs anti-rolling suspension control for lowering the vehicular height in response to a laterally exerted inertia force. The control means may vary a variation rate of said suspension control command versus variation of said sensor signal value so that said variation rate is smaller at least in a sensor signal value range in the vicinity of said first and second values. In this case, the sensor signal valve may be variable across said first and second values and further across a third value set between said first and second values and corresponding to the vehicular state where the inertia force exerted on the vehicular body is zero, and said variation rate of said suspension control command in the sensor signal range in the vicinity of said third value is greater than said variation rate in the vicinity of said first and second values. The suspension control command may vary according to variation of said sensor signal value at a first variation rate in a sensor signal value range between said third value and a fourth value greater than said third value and smaller than said first value, and a second variation rate in a sensor signal value range between said fourth value and said first value. The suspension control command may also vary according to variation of said sensor signal value at a third variation rate in a sensor signal value range between said third value and a fifth value smaller than said third value and greater than said second value, and a fourth variation rate in a sensor signal value range between said fifth value and said second value.

In the alternative, the variation rate is continuously varied so that a greater variation rate is obtained in the vicinity of said third value and smaller variation rate is obtained in the vicinity of said first and second values. Furthermore, the suspension control command may be provided for one side of the vehicular body for hardening suspension control and for the other side of the vehicular body for softening suspension control for regulating vehicular attitude, said sensor signal valve is variable across said first and second values and further across a third value set between said first and second values and corresponding to the vehicular state where the inertia force exerted on the vehicular body is zero, and said variation rate of said hardening suspension control command in the sensor signal range in a first sensor signal value range defined in the vicinity of said third value is greater than said variation rate in a second sensor signal value range defined in the vicinity of said first value, and said variation rate of said softening suspension control command in a third range defined in the vicinity of said third sensor signal value value is greater than the variation rate in a fourth sensor signal value range defined in the vicinity of said second value. In such a case, the fourth sensor signal value range may be smaller than said second sensor signal value range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments but are for explanation and understanding only.

In the drawings:

FIG. 7 is a chart showing variation of fluid pressure in a working chamber in the anti-pitching suspension control versus magnitude of longitudinal acceleration exerted on the vehicular body;

DESCRIPTION OF THE PREFERRED EMBODIMENT

Figure 1:
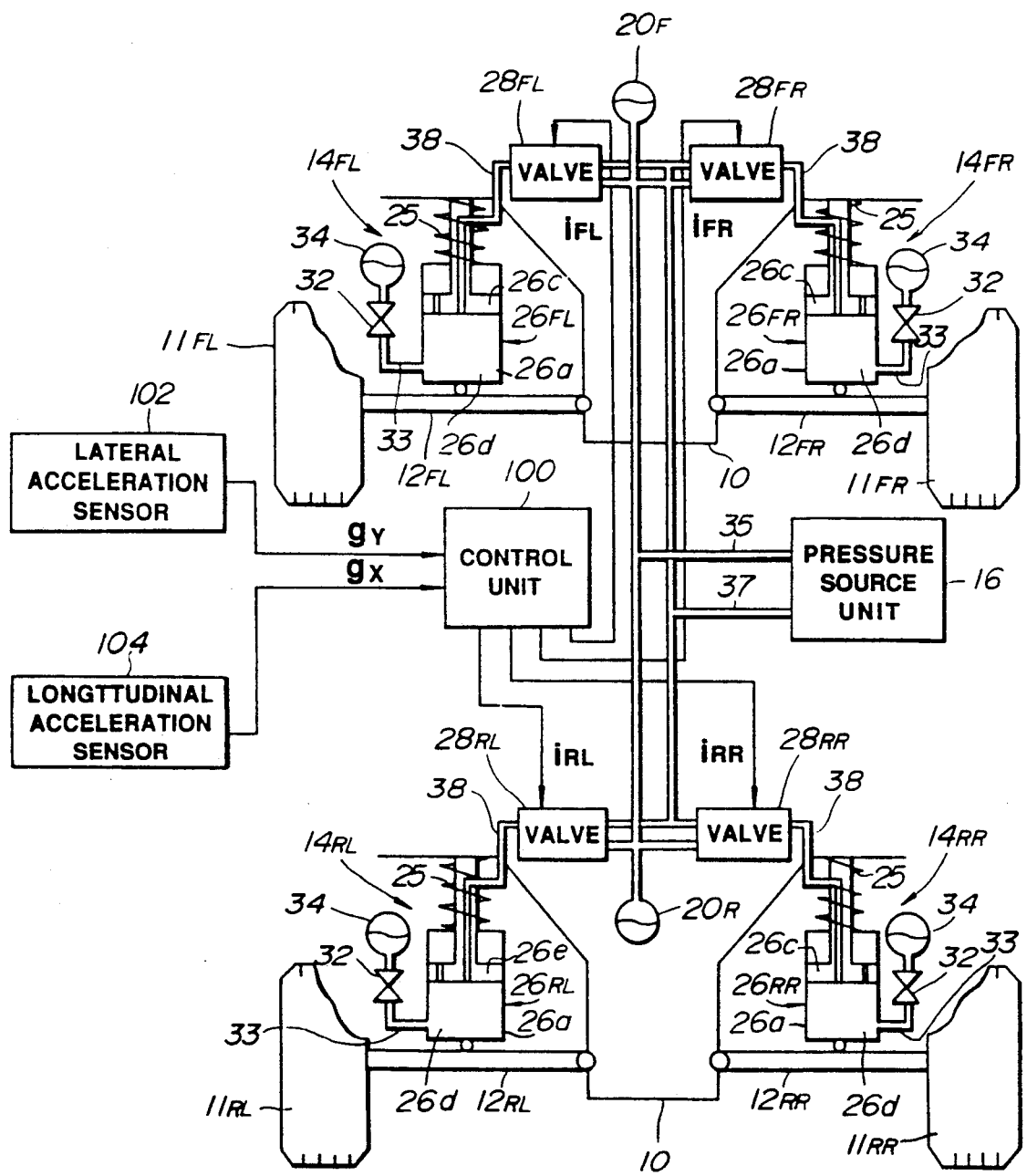
FIG. 1 is a diagrammatic illustration of the preferred embodiment of an active suspension system according to the present invention.

Referring now to the drawings, particularly to FIG. 1, the preferred embodiment of an active suspension system, according to the present invention, is designed to generally perform suspension control for regulating vehicular height level and, vehicular attitude by suppressing relative displacement between a vehicular body 10 and suspension members $12_{FL}$, $12_{FR}$, $12_{RL}$ and $12_{RR}$ of front-left, front-right, rear-left and rear-right suspension mechanism $14_{FL}$, $14_{FAR}$, $14_{AIL}$ and $14_{RR}$ and rotatably supporting front-left, front-right, rear-left and rear-right wheels $11_{FL}$, $11_{FR}$, $11_{RL}$ and $11_{RR}$. The suspension mechanism as generally referred to will be hereafter represented by the reference numeral "14". Respective front-left, front-right, rear-left and rear-right suspension mechanisms $14_{FL}$, $14_{FR}$, $14_{RL}$ and $14_{RR}$ have hydraulic cylinders $26_{FL}$, $26_{FR}$, $26_{RL}$ and $26_{RR}$ which will be represented by the reference numeral "26" as generally referred to.

Each of the hydraulic cylinder 26 is disposed between the vehicular body 10 and the suspension member $12_{FL}$, $12_{FR}$, $12_{RL}$ and $12_{RR}$ to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d. The piston 26c is connected to the associated one of suspension member 12 via a piston rod 26d. A suspension coil spring 25 is also provided in respective of suspension mechanisms. However, in contrast to the normal or ordinary suspension systems, the suspension coil spring to be employed in the shown type of the suspension system is not required to provide a resilient force in a magnitude required in the ordinary suspension system and is only required to provide the resilient force necessary for maintaining the vehicular body about the suspension member.

The working chamber 26d of the hydraulic cylinder 26 is connected one of pressure control valves $28_{FL}$, $28_{FAR}$, $28_{AIL}$ and $28_{RR}$ via a pressure control line 38. The pressure control valve $28_{FL}$, $28_{FAR}$, $28_{AIL}$ and $28_{RR}$ will be hereafter represented by the reference numeral "28" as generally referred to. The pressure control valve 28 has a control port 28c communicated with the working chamber 26d via the pressure control line 38. The pressure control valve 28 also has an inlet port 28s and a drain port 28r. The inlet port 28s of the pressure control valve 28 is connected to a pressure source unit 16 via a supply line 35, and the drain port 28r thereof is communicated with a drain line 37. The pressure control valve 28 incorporates a proportioning solenoid 26e for adjusting valve position according to magnitude of suspension control signal $I_{FL}$, $I_{FR}$, $I_{RL}$ and $I_{RR}$ supplied from the control unit 100. The suspension control signal $I_{FL}$, $I_{FR}$, $I_{RL}$ and $I_{RR}$ are current signal each having a variable current value representative of a commanding pressure in the working chamber. A branch circuit is provided for connecting the working chamber 26d to a pressure accumulator 34 via a flow path 33 and a flow restricting means, such as an orifice 32. This pressure accumulator 34 may be hereafter referred to as "low pressure accumulator". Another pressure accumulators $20_F$ and $20_R$ are provided in the supply line 35 for accumulating the excessive pressure generated in the pressure source unit 16.

The pressure control valves 28 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U. S. Pat. No. 4,903,983, issued on Feb. 27, 1990;
U.S. patent application Ser. No. 059,888, filed on June 9, 1987, corresponding European Patent Application has been published as First Publication No. 02 49 209;
U.S. patent application Ser. No. 060,856, filed on June 12, 1987, corresponding European Patent Application has been published as First Publication No. 02 49 227;
U.S. Pat. No. 4,909,534, issued on Mar. 20, 1990;
U.S. Pat. No. 4,801,115, issued on Jan. 31, 1989;
U.S. Pat. No. 4,888,696, issued on Dec. 19, 1989;
U.S. Pat. No. 4,848,790, issued on July 19, 1989;
U.S. Pat. No. 4,865,348, issued on Sept. 12, 1989;
U. S. Pat. No. 4,938,499, issued on July 3, 1990;
U.S. Pat. No. 4,943,084, issued on July 24, 1990;
U.S. Pat. No. 4,967,360, issued on Dec. 30, 1970;
U.S. patent application Ser. No. 261,870, filed on Oct. 25, 1988;
U.S. Pat. No. 4,905,152, issued on Feb. 27, 1990;
U.S. Pat. No. 4,919,440, issued on Apr. 24, 1990;
U.S Pat. No. 5,013,061, issued on May 7, 1990;
U.S. Pat. No. 4,911,469, issued on Mar. 27, 1990;
U.S. patent application Ser. No. 327,460, filed on Mar. 22, 1989;
U.S. Pat. No. 4,948,165, issued on Aug. 14, 1990;
U.S. Pat. No. 4,911,468, issued on Mar. 27, 1990;
U.S. Pat. No. 4,911,470, issued on Mar. 27, 1990;
U.S. patent application Ser. No. 364,477, filed on June 12, 1989;
U.S. patent application Ser. No. 365,468, filed on June 12, 1989.

The disclosures of the foregoing co-pending applications are herein incorporated by reference for the sake of disclosure contained therein.

The pressure control valve 28 employed in the shown embodiment incorporates a proportioning solenoid 28e for adjusting valve position and thus adjusts control pressure Pc to be supplied to the working chamber 26d of the associated one of the hydraulic cylinder 26. In practice, the pressure control valve 28 employed in the shown embodiment is designed as pilot operated valve, in which the pilot pressure is adjusted by the position of the proportioning solenoid.

For adjusting control pressure at the control port 28c by adjusting the position of the proportioning solenoid 28e, a suspension control signal which is in a form of a current signal having a current variable depending upon the command value. The suspension control command value is derived by a control unit 100. In order to perform height regulation and attitude regulation for the vehicular body, the control unit 100 is connected to a plurality of sensors for monitoring various suspension control parameters. Parameters for performing suspension control and data processing for deriving the suspension control command values have been discussed in various copending applications set forth above. Amongst, the following disclosure may be concentrated for anti-rolling and anti-pitching suspension control which may be combined with any other logic of suspension control.

Though the suspension control may perform various control logic, the following discussion will be concentrated to anti-rolling and anti-pitching control to be performed by the control unit 100. In order to do this, the control unit 100 is connected to a lateral acceleration sensor 102 and a longitudinal acceleration sensor 104. The lateral acceleration sensor 102 is designed to produce a lateral acceleration indicative signal $g_y$ representative of a magnitude of lateral acceleration exerted on the vehicular body 10. As can be appreciated, the lateral acceleration exerted on the vehicular body represents inertia force transverse to the vehicular axis. Therefore, the lateral acceleration indicative signal $g_y$ generated by the lateral acceleration sensor 102 in fact represents magnitude of inertia force, i.e. centrifugal force, induced at turning or cornering of the vehicle. For enabling this, the lateral acceleration sensor 102 may be mounted on an appropriate position of the vehicular body. As will be appreciated, a plurality of such lateral sensors may be employed to optimize detection of the lateral acceleration.

On the other hand, the longitudinal acceleration sensor 104 is designed to produce a longitudinal acceleration indicative signal $g_x$ representative of the longitudinal acceleration exerted on the vehicular body. Similarly to the foregoing, the longitudinal acceleration represents inertia force in a direction parallel to the vehicular axis, induced during acceleration and deceleration for causing squat and nose-dive. Therefore, the longitudinal acceleration indicative signal $g_x$ produced by the longitudinal acceleration sensor 104 represents the magnitude of longitudinally exerted inertia force on the vehicular body.

Both of the lateral acceleration indicative signal $g_y$ and the longitudinal acceleration indicative signal $g_x$ are analog signals having voltage level variable depending upon the magnitude of the lateral and longitudinal acceleration exerted on the vehicular body.

The control unit 100 comprises analog-to-digital (A/D) converters 106Y and 106X to convert the analog form lateral and longitudinal acceleration indicative signals $g_y$ and $g_x$ into digital signals. The A/D converters 106Y and 106X feed digital form lateral and longitudinal acceleration indicative signals $g_y$ and $g_x$ to a microprocessor 110 which comprises an input/output interface 112, an arithmetic circuit 114 and a memory unit 116. The microprocessor 110 processes the lateral and longitudinal acceleration indicative signals $g_y$ and $g_x$ to derive lateral and longitudinal acceleration data $G_Y$ and $G_X$ and produce front-left, front-right-rear-left and rear-right suspension control commands $V_{FL}$, $V_{FR}$, $V_{RL}$ and $V_{RR}$ in forms of voltage signals having voltage level representative of required magnitude of control pressure Pc to be supplied from the pressure control valves $28_{FL}$, $28_{FR}$, $28_{RL}$ and $28_{RR}$ to respectively corresponding working chambers 26d of the hydraulic cylinders $26_{FL}$, $26_{FR}$, $26_{RL}$ and $26_{RR}$. In practice, the suspension control commands $V_{FL}$, $V_{FR}$, $V_{RL}$ and $V_{RR}$ have voltage levels representative of the pressure off-set of the control pressure Pc from a predetermined neutral pressure $P_N$. The front-left, front-right-rear-left and rear-right suspension control commands $V_{FL}$, $V_{FR}$, $V_{RL}$ and $V_{RR}$ are converted into analog signals by digital-to-analog (D/A) converters 120FL, 120FR, 120RL and 120RR. The D/A converted front-left, front-right-rear-left and rear-right suspension control commands $V_{FL}$, $V_{FR}$, $V_{RL}$ and $V_{RR}$ are supplied to driver circuits $122_{FL}$, $122_{FR}$, $122_{RL}$ and $122_{RR}$. The driver circuits $122_{FL}$, $122_{FR}$, $122_{RL}$ and $122_{RR}$ comprise current signal generator, such as floating type constant current generator, for producing current signal form front-left, front-right-rear-left and rear-right suspension control signals $I_{FL}$, $I_{FR}$, $I_{RL}$ and $I_{RR}$ having current value variable corresponding to the suspension control command values $V_{FL}$, $V_{FR}$, $V_{RL}$ and $V_{RR}$. The suspension control signals $I_{FL}$, $I_{FR}$, $I_{RL}$ and $I_{RR}$ are fed to proportioning solenoids of respectively corresponding pressure control valves $28_{FL}$, $28_{RL}$, $28_{RL}$ and $28_{RR}$ for controlling pilot pressure therein and whereby controlling the control pressure Pc to be supplied to the corresponding working chambers 26d.

Figure 2:
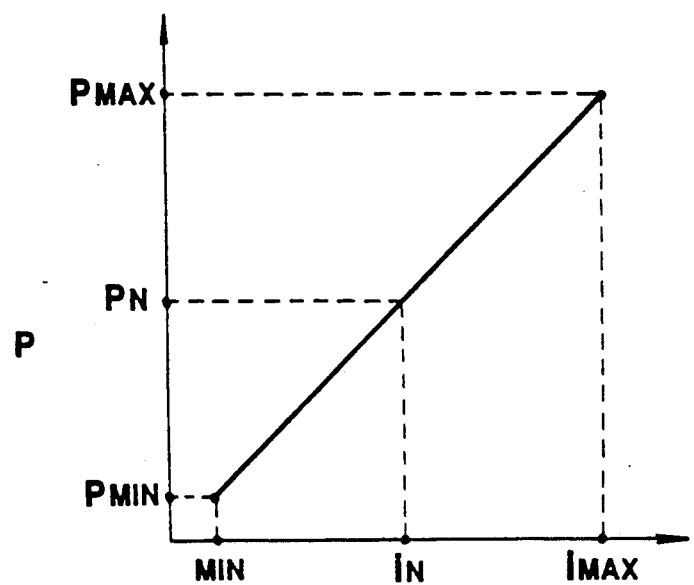
FIG. 2 is a chart showing variation of control pressure level Pc relative to current level of a suspension control signal i.

As shown in FIG. 2, the control pressure Pc to be supplied from the pressure control valve 28 to the working chamber 26d via the control line 38 is variable between a predetermined maximum pressure $P_{max}$ and a predetermined minimum pressure $P_{min}$ across the predetermined neutral pressure $P_N$ while the suspension control signal varies its current level between a predetermined maximum value $I_{max}$ and a predetermined minimum value $I_{min}$. The neutral pressure $P_N$ of the control pressure Pc is produced in response to the suspension control signal having a value $I_N$.

Figure 3:
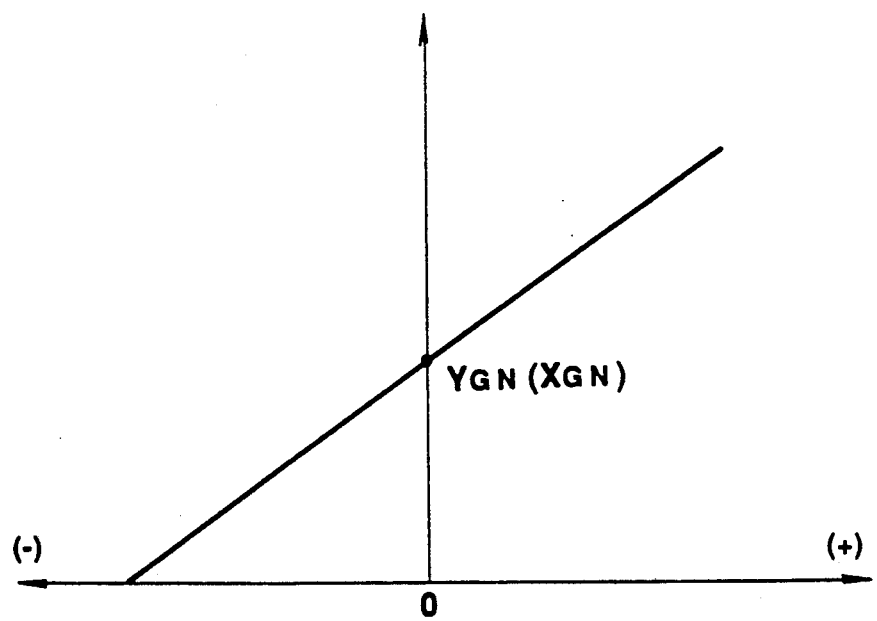
FIG. 3 is a chart showing variation of output level of acceleration sensor in relation to acceleration exerted on the vehicular body.
Figure 4:
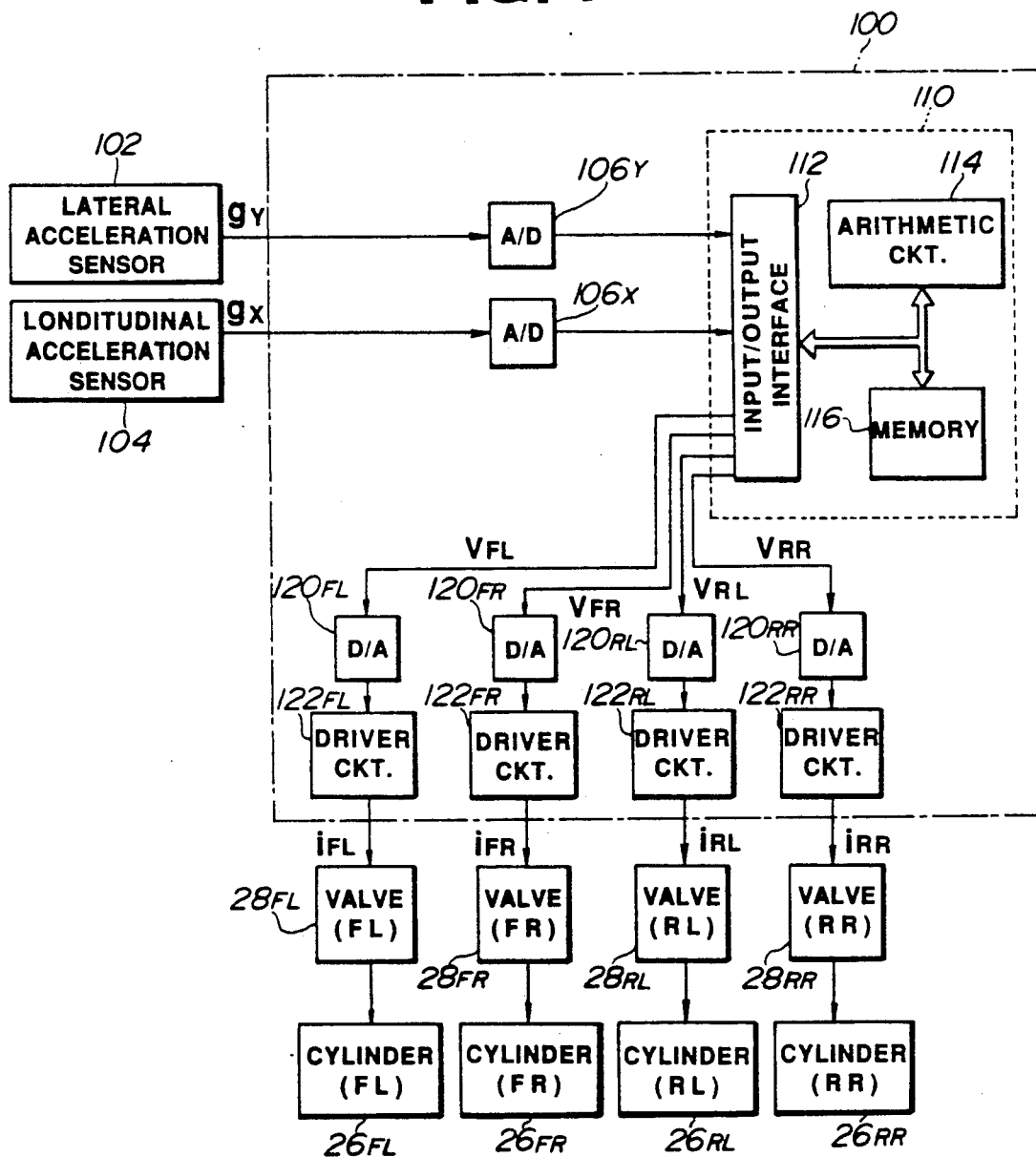
FIG. 4 is a block diagram of a suspension control system employed in the shown embodiment of the active suspension system according to the invention.

On the other hand, as seen from FIG. 3, the output levels of the lateral and longitudinal acceleration sensors 102 and 104 are variable according to the characteristics as illustrated. Namely, when the lateral or longitudinal acceleration exerted on the vehicular body is zero, the output level of the lateral or longitudinal acceleration sensor 102 and 104 is maintained at a predetermined neutral level $Y_{GN}$ or $X_{GN}$. In the shown embodiment, the lateral acceleration sensor 102 increases the output level from the neutral level $Y_{GN}$ in response to increasing lateral acceleration directed right. On the other hand, the output level of the lateral acceleration sensor 102 decrease from the neutral level $Y_{GN}$ in response to increasing lateral acceleration directed left. Similarly, the longitudinal acceleration sensor 104 increases the output level in response to rearward acceleration, i.e. deceleration for the vehicle and decreases in response to forward acceleration, i.e. acceleration of the vehicle.

In the practical construction of the active suspension system, respective of the suspension control command values are derived with incorporating a neutral pressure indicative component $V_N$, an anti-pitching control component $VP_i$ (i: FL, FR, RL and RR) and an anti-rolling control component $VR_i$. Namely, respective of the front-left, front-right, rear-left and rear-right suspension control commands $V_{FL}$, $V_{FR}$, $V_{RL}$ and $V_{RR}$ can be expressed by:

$$V_{FL} = V_N - VR_{FL} + VP_{FL}$$

$$V_{FR} = V_N + VR_{FR} + VP_{FR}$$

$$V_{RL} = V_N - VR_{RL} - VP_{RL}$$

$$V_{RR} = V_N + VR_{RR} - VR_{RR}.$$

Though it can be naturally appreciated that it is preferred to perform both of anti-pitching control and anti-rolling control, it is course possible to facilitate the suspension control for performing either one of anti-pitching and anti-rolling control. For the sake of disclosure and facilitating better understanding, the following discussion will be given for the anti-pitching suspension control and the anti-rolling suspension control independently of the other.

Figure 5:
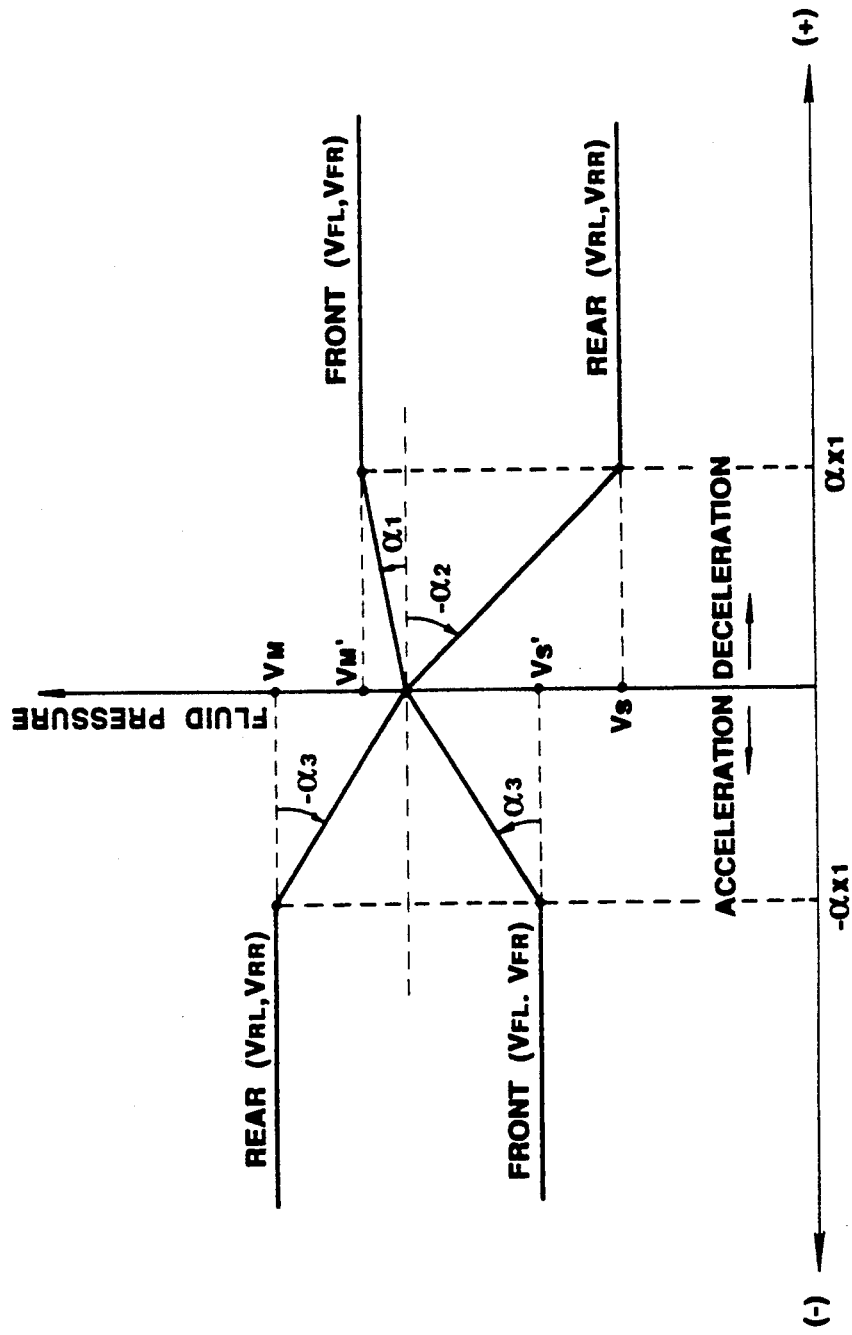
FIG. 5 is a chart showing variation of an anti-pitching suspension control command value versus magnitude of longitudinal acceleration exerted on a vehicular body.

FIG. 5 shows characteristics of variation of suspension control commands $V_{FL}$, $V_{FR}$, $V_{RL}$ and $V_{RR}$ signals having component according to variation of the longitudinal acceleration indicative signal value $g_x$. The suspension control commands $V_{FL}$, $V_{FR}$, $V_{RL}$ and $V_{RR}$ are derived according to the variation characteristics as shown in FIG. 5 and vary in relation to a neutral value $V_N$. Therefore, while no longitudinal acceleration is exerted on the vehicular body and thus the longitudinal acceleration indicative signal $g_x$ is maintained at the neutral value $X_{GN}$, all of the front-left, front-right, rear-left and rear-right suspension control commands $V_{FL}$, $V_{FR}$, $V_{RL}$ and $V_{RR}$ are maintained at the neutral value $V_N$. Therefore, the pilot pressures in the pressure control valves 28 are maintained at the neutral pressure $P_N$ so that neutral pressure of the control pressure Pc can be supplied from the control port to the working chambers 26d of the hydraulic cylinders $26_{FL}$, $26_{FR}$, $26_{RL}$ and $26_{RR}$. As a result, the vehicular height level at orientations of the front-left, front-right, rear-left and rear-right suspension systems $14_{FL}$, $14_{FR}$, $14_{RL}$ and $14_{RR}$ can be maintained within a target height range defined in the vicinity of the target height.

On the other hand, when the vehicle is decelerated, backward acceleration (deceleration) is induced. The magnitude of the deceleration substantially corresponds to the forward inertia force exerted on the vehicular body, which forward inertia force causes nose-dive. As set forth, since the longitudinal acceleration sensor 104 is designed to produce the longitudinal acceleration indicative signal $g_x$ having a signal value greater than the neutral value $V_N$. Therefore, the longitudinal acceleration data value $\alpha x$ becomes positive value. In such case, the front-left and front-right suspension control commands $V_{FL}$ and $V_{FR}$ becomes greater value than the neutral value $V_N$ for harder suspension characteristics at the front-left and front-right suspension systems 14FL and 14FR. On the other hand, the rear-left and rear-right suspension control commands $V_{RL}$ and $V_{RR}$ becomes smaller value than the neutral value $V_N$ for softer suspension characteristics at the rear-left and rear-right suspension systems $14_{RL}$ and $14_{RR}$.

When the longitudinal acceleration data $\alpha x$ is greater then zero and smaller than or equal to a deceleration threshold $\alpha x_1$, e.g. 0.5 G, the front-left and front-right suspension control commands $V_{FL}$ and $V_{FR}$ are increased toward a predetermined maximum value $V_M'$ in a rate $\alpha_1$. On the other hand, the rear-left and rear-right suspension control commands $V_{RL}$ and $V_{RR}$ are decreased toward a predetermined minimum value $V_S$ in a rate $-|\alpha_2|$. As can be seen, the absolute value of variation rate $|\alpha_2|$ is greater than the absolute value of the variation rate $|\alpha_1|$. On the other hand, when the longitudinal acceleration data $\alpha x$ is greater than the deceleration threshold $\alpha x_1$, the front-left and front-right suspension control commands $V_{FL}$ and $V_{FR}$ are maintained at the maximum value $V_M'$, and the rear-left and rear-right suspension control commands $V_{RL}$ and $V_{RR}$ are maintained at the minimum value $V_S$.

When the vehicle is accelerated, forward acceleration is induced. The magnitude of the acceleration substantially corresponds to the rearward inertia force exerted on the vehicular body, which rearward inertia force causes squat. The longitudinal acceleration data value $\alpha x$ becomes negative value. In such case, the front-left and front-right suspension control commands $V_{FL}$ and $V_{FR}$ becomes smaller value than the neutral value $V_N$ for softer suspension characteristics at the front-left and front-right suspension systems 14FL and 14FR. On the other hand, the rear-left and rear-right suspension control commands $V_{RL}$ and $V_{RR}$ becomes greater value than the neutral value $V_N$ for harder suspension characteristics at the rear-left and rear-right suspension systems 14RL and 14RR.

When the negative value of the longitudinal acceleration data $-\alpha x$ is smaller than zero and greater than or equal to an acceleration threshold $-\alpha x_1$, e.g.—0.5 G, the front-left and front-right suspension control commands $V_{FL}$ and $V_{FR}$ are decreased toward a predetermined minimum value $V_S'$ in a rate $\alpha_3$. On the other hand, the rear-left and rear-right suspension control commands $V_{RL}$ and $V_{RR}$ are increased toward a predetermined minimum value $V_M$ in a rate $-\alpha_3$. As can be seen, the absolute value of variation rate $|\alpha_3|$ is smaller than the absolute value of the variation rate $|\alpha_2|$ and greater than the absolute value of the variation rate $|\alpha_1|$. On the other hand, when the longitudinal acceleration data $-\alpha x$ is smaller than the deceleration threshold $-\alpha x_1$, the front-left and front-right suspension control commands $V_{FL}$ and $V_{FR}$ are maintained at the minimum value $V_S'$, and the rear-left and rear-right suspension control commands $V_{RL}$ and $V_{RR}$ are maintained at the maximum value $V_M$.

Figure 6:
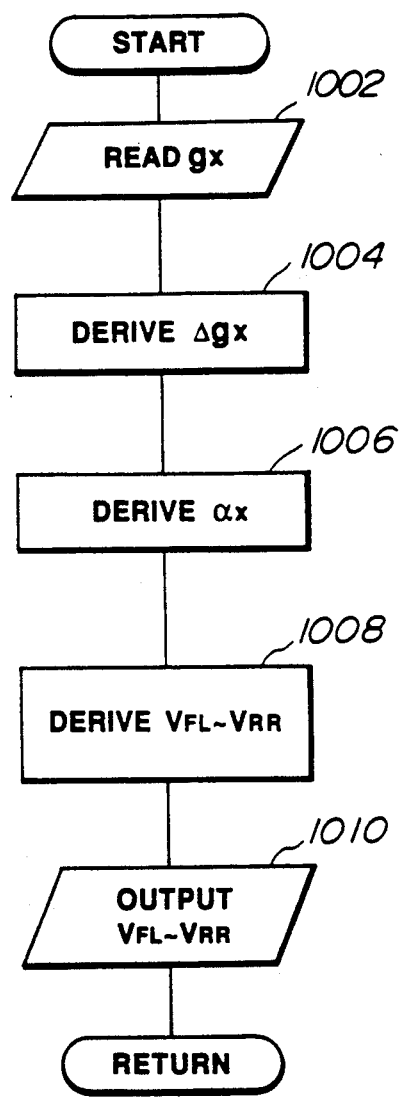
FIG. 6 is a flowchart showing a routine for anti-pitching suspension control performed in the suspension control system of FIG. 4.

The practical control operation to be taken place by the control unit 100 will be discussed with reference to FIG. 6, in which is shown a flowchart of an anti-pitching suspension control routine to be executed by the microprocessor 110. The shown routine is programmed as an interrupt routine to be executed at every given timing, e.g. every 20 msec.

Immediately after starting execution, the longitudinal acceleration indicative signal $g_x$ is read out, at a step 1002. From the read longitudinal acceleration indicative signal value $g_x$, a preset neutral acceleration indicative value $X_{GN}$ is subtracted to derive longitudinal acceleration indicative data $\Delta g_x$ is derived at a step 1004. Then, on the basis of the longitudinal acceleration indicative data $\Delta g_x$, the longitudinal acceleration data $\alpha x$ is derived at a step 1006. In practice, the longitudinal acceleration data $\alpha x$ is set in the memory unit 116 in forms of look-up tables. Therefore, in the practical operation at the step 1006, is table look-up for deriving the longitudinal acceleration data $\alpha x$ in terms of the longitudinal acceleration indicative data $\Delta g_x$.

At step 1008, the anti-pitching front-left, front-right, rear-left and rear-right suspension control commands $V_{FL}$, $V_{FR}$, $V_{RL}$ and $V_{RR}$ are derived according to the variation characteristics as shown in FIG. 5. Practically, the variation characteristics of the suspension control commands in relation to the longitudinal acceleration data $\alpha x$ is set in the memory unit 116 in a form of look-up table. Therefore, derivation of the front-left, front-right, rear-left and rear-right suspension control commands $V_{FL}$, $V_{FR}$, $V_{RL}$ and $V_{RR}$ is performed by table look-up. However, the shown embodiment takes the way of table look-up for deriving the suspension control command values, it may also be possible to obtain the equivalent command values by arithmetic process as a function of the longitudinal acceleration data $\alpha x$. Thereafter, at a step 1010, the front-left, front-right, rear-left and rear-right suspension control commands $V_{FL}$, $V_{FR}$, $V_{RL}$ and $V_{RR}$ are output to respectively corresponding driver circuits $122_{FL}$, $122_{FR}$, $122_{RL}$ and $122_{RR}$ via the D/A converters $120_{FL}$, $120_{FR}$, $120_{RL}$ and $120_{RR}$. The driver circuits $122_{FL}$, $122_{FR}$, $122_{RL}$ and $122_{RR}$ then outputs the suspension control signals $I_{FL}$, $I_{FR}$, $I_{RL}$ and $I_{RR}$ for adjusting pilot pressure at respective of the pressure control valves $28_{FL}$, $28_{FR}$, $28_{RL}$ and $28_{RR}$.

While the vehicle travels smooth straight road at constant speed, vehicular pitching will never induced. Therefore, the longitudinal acceleration indicative signal $g_x$ are maintained substantially the neutral values $Y_{GN}$. Therefore, the longitudinal acceleration data $\alpha x$ derived at the step 1006 in the foregoing routine are maintained substantially zero. Therefore, the antirolling suspension control command values $V_{FL}$, $V_{FR}$, $V_{RL}$ and $V_{RR}$ are substantially maintained at the neutral command value $V_N$. Therefore, the suspension control signals $I_{FL}$, $I_{FR}$, $I_{RL}$ and $I_{RR}$ have the current value $I_N$ corresponding to the neutral pressure $P_N$.

On the other hand, when vehicular brake is applied for deceleration, the positive value of the longitudinal acceleration $\alpha x$ is increased according to increasing of magnitude of deceleration. Therefore, the front-left and front-right suspension control command values $V_{FL}$ and $V_{FR}$ are increased toward the maximum value $V_M'$ in a rate of $\alpha_1$, and the rear-left and rear-right suspension control command values $V_{RL}$ and $V_{RR}$ are decreased toward the minimum value $V_S$ in a rate of $-\alpha_2$. By this, the front suspension systems $14_{FL}$ and $14_{FR}$ are hardened by increasing the fluid pressure in the working chambers $26d$ in the front-left and front-right hydraulic cylinders $26_{FL}$ and $26_{FR}$. On the other hand, the rear suspension systems $14_{RL}$ and $14_{RR}$ are softened by decreasing the fluid pressure in the working chambers $26d$ of the rear-left and rear-right hydraulic cylinders $26_{RL}$ and $26_{RR}$. Since the variation rate of the front-left and front-right suspension control command values $\alpha_1$ is set at smaller value for setting the maximum value $V_M'$ smaller than $V_M$ and the rear-left and rear-right suspension control command variation rate $-\alpha_2$ is greater than normal value for setting the minimum value $V_S$ at lower level than the standard level. As a result, the anti-pitching effect will be weakened for permitting permissible magnitude of vehicular pitching. At the same time, the vehicular body height may be lowered without causing substantial lift at the rear side of the vehicular body. Therefore, better vehicular brake feeling can be obtained.

Furthermore, in the shown embodiment, since the increasing rate of the fluid pressure in the working chamber of the front suspension system is set smaller than normal increasing rate during deceleration, pressure accumulators 34 may not become completely rigid and hold additional capacity. Therefore, the vibration energy having frequency in the vicinity of resonance frequency of the unsprung mass can be successfully absorbed for assuring high level of riding comfort.

Figure 8:
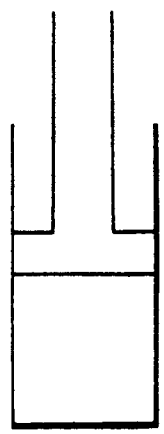
FIG. 8 is an explanatory illustration of a pressure accumulator.
Figure 9:
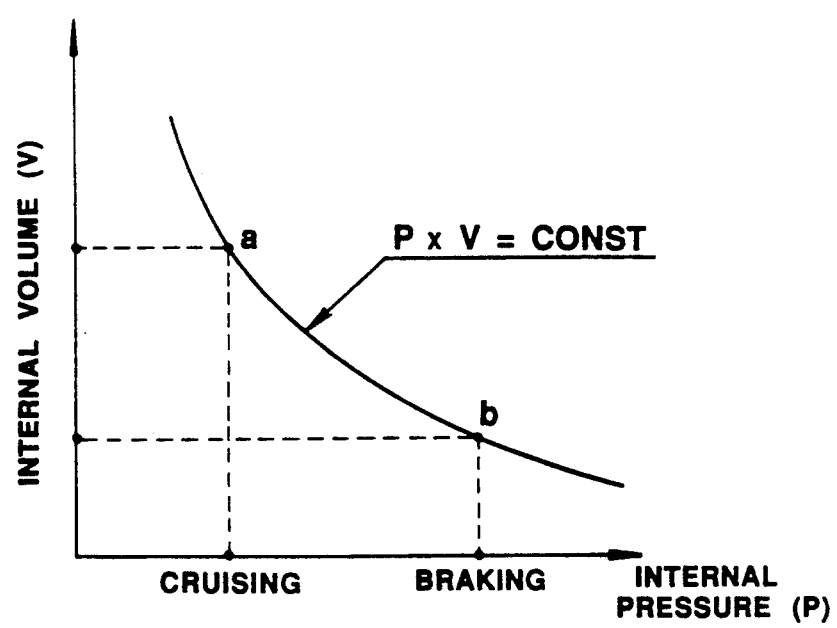
FIG. 9 is a chart showing variation of internal volume of the pressure accumulator relative to variation of internal pressure thereof.

Assurance of riding comfort may be further discussed with reference to FIGS. 8 and 9. In the model of the cylinder in FIG. 8, it is assumed that cross sectional area of the piston is A; the internal pressure is P, the piston stroke is x, and reacting force on the road is F. Then, the spring constant of the model cylinder can be expressed by:

$$K = \Delta F / \Delta x$$

where $F = P \times A$; $\Delta F = \Delta P \times A$; $\Delta V = A \times \Delta x$; and $\Delta x = \Delta V / A$.

Therefore, the foregoing equation can be modified as:

$$\begin{aligned} K &= \Delta F / \Delta x \\ &= (\Delta P \times A)/(\Delta V / A) \\ &= A^2 \times (\Delta P / \Delta V) \end{aligned}$$

As can be appreciated herefrom, the spring constant is proportional to $\Delta P / \Delta V$. Therefore, when $(P \times V)$ is constant, the internal pressure b at the deceleration becomes higher than that a in the constant speed cruising.

Consequently, when the fluid pressure at the front suspension systems are adjusted to the standard maximum pressure, the internal volume V is substantially reduced for resulting substantially rigid characteristics. In such case, the relatively high frequency of vibration is transmission from the road wheel to the vehicular body to cause degradation. In contrast to this, since the shown embodiment limits the maximum pressure at lower level than the standard maximum pressure, the internal pressure of the accumulator can be maintained at smaller value for permitting absorption of the relatively high frequency vibration.

It should be appreciated though the shown embodiment varies the variation rate of the suspension control command versus variation of the longitudinal acceleration with a common deceleration and acceleration threshold at front and rear suspension systems, it may be possible to use the uniform variation rate with different deceleration and acceleration thresholds or with different fluid pressure limit.

Figure 10:
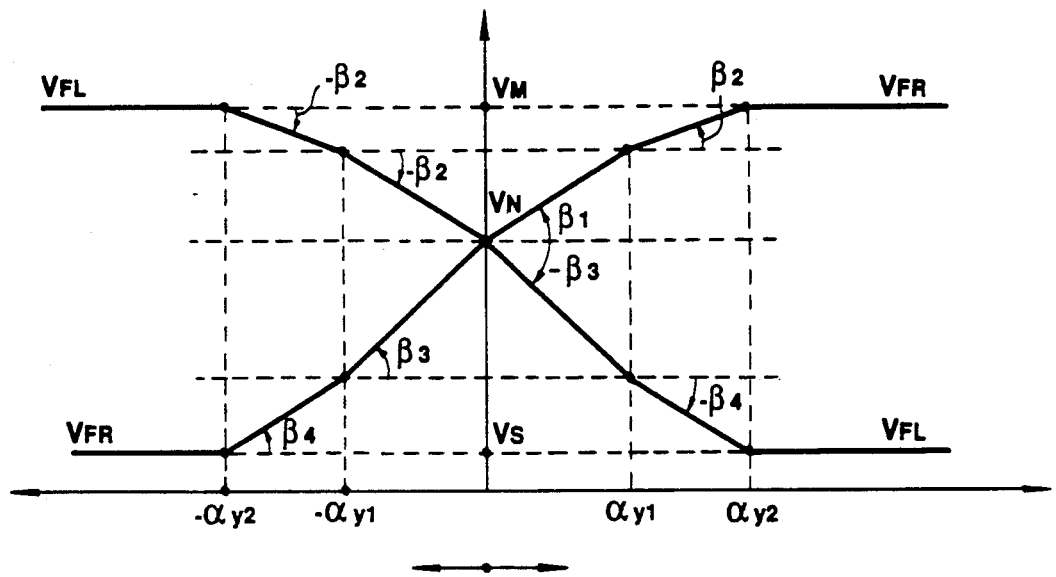
FIG. 10 is a chart showing variation of front-left and front-right suspension control commands in relation to lateral acceleration magnitude.
Figure 11:
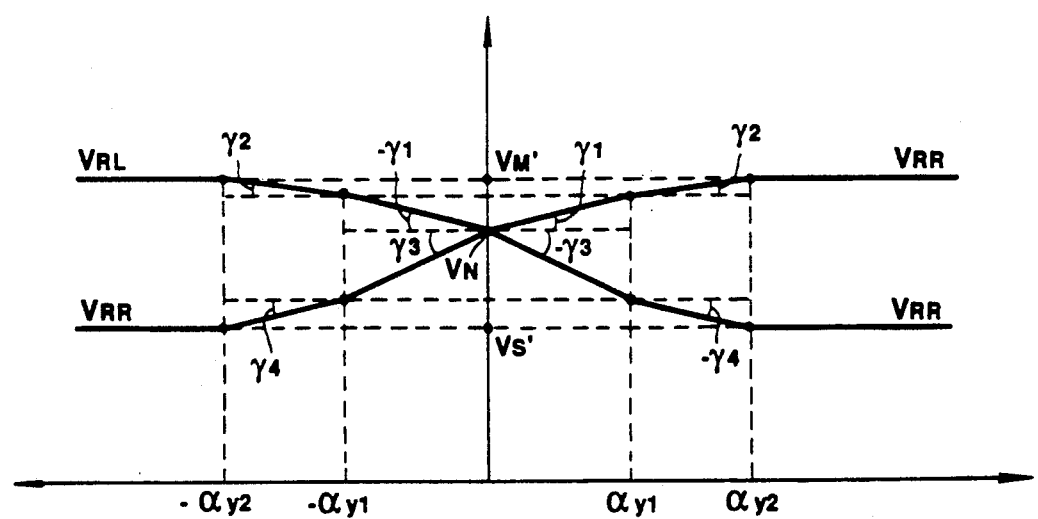
FIG. 11 is a chart showing variation of rear-left and rear-right suspension control commands in relation to lateral acceleration magnitude.
Figure 13:
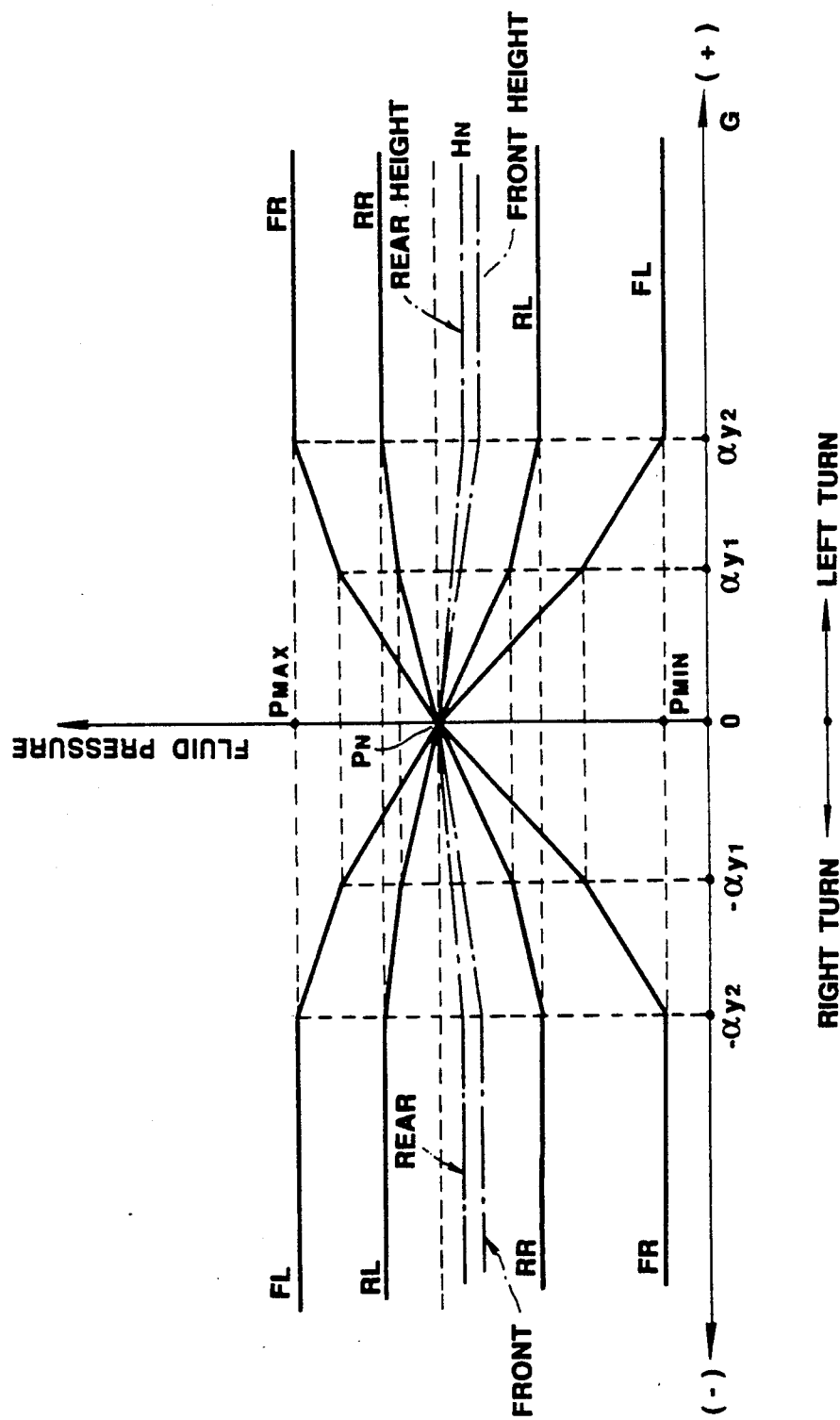
FIG. 13 is a chart showing variation of fluid pressure in the working chamber in relation to variation of the lateral acceleration.

On the other hand, anti-rolling suspension control, in the shown embodiment of the active suspension system, is performed in the variation characteristics of the suspension control commands as illustrated in FIGS. 10 and 11. As can be seen FIGS. 10 and 11, the variation characteristics of the front suspension control commands $V_{FL}$ and $V_{FR}$ (FIG. 10) is differentiated from that of the rear suspension control commands $V_{RL}$ and $V_{RR}$ (FIG. 11).

FIG. 10 shows characteristics of variation of front-left and front-right suspension control commands $V_{FL}$ and $V_{FR}$ having component according to variation of the lateral acceleration indicative signal value $g_y$. The suspension control commands $V_{FL}$ and $V_{FR}$ are derived according to the variation characteristics as shown in FIG. 10 and vary in relation to a neutral value $V_N$. Therefore, while no lateral acceleration is exerted on the vehicular body and thus the lateral acceleration indicative signal $g_y$ is maintained at the neutral value $X_{GN}$, both of the front-left and front-right control commands $V_{FL}$ and $V_{FR}$ are maintained at the neutral value $V_N$. Therefore, the pilot pressures in the pressure control valves 28 are maintained at the neutral pressure $P_N$ so that neutral pressure of the control pressure Pc can be supplied from the control port to the working chambers $26d$ of the hydraulic cylinders 26FL and 26FR. As a result, the vehicular height level at orientations of the front-left and front-right suspension systems 14FL and 14FR can be maintained within a target height range defined in the vicinity of the target height.

On the other hand, when the vehicle steering operation is performed for turning left, right-hand lateral acceleration (centrifugal force) is induced. The magnitude of the right-hand lateral acceleration substantially corresponds to the rightward centrifugal force exerted on the vehicular body, which right-hand lateral force causes right-hand vehicular rolling. As set forth, since the lateral acceleration sensor 102 is designed to produce the lateral acceleration indicative signal $g_y$ having a signal value greater than the neutral value $V_N$ in response to the right-hand lateral acceleration. Therefore, the lateral acceleration data value $\alpha y$ becomes positive value. In such case, the front-right suspension control command $V_{FR}$ becomes greater value than the neutral value $V_N$ for harder suspension characteristics at the front-right suspension system 14FR. On the other hand, the front-left suspension control command $V_{FL}$ becomes smaller value than the neutral value $V_N$ for softer suspension characteristics at the front-left and rear-right suspension systems $14_{FL}$.

When the lateral acceleration data $\alpha y$ is greater then zero and smaller than or equal to a first lateral acceleration threshold $\alpha y_1$ e.g. 0.3 G, the front-right suspension control command $V_{FR}$ is increased in a rate $\beta_1$. On the other hand, the front-left suspension control command $V_{FL}$ is decreased in a rate $-\beta_3$. On the other hand, when the lateral acceleration data value $\alpha y$ is greater than $\alpha y_1$ but smaller than or equal to a second lateral acceleration threshold $\alpha y_2$, e.g. 0.5 G, the front-right suspension control command $V_{FR}$ is increased toward a predetermined maximum value $V_M$ in a rate $\beta_2$ which is smaller than $\beta_1$. On the other hand, the front-left suspension control command $V_{FL}$ is decreased toward a predetermined minimum value $V_S$ in a rate $-\beta_4$ which is also smaller than $-\beta_3$.

As can be seen, the absolute value of variation rate $\beta_3|$ and $\beta_4|$ are respectively greater than the absolute value of the variation rate $|\beta_1|$ and $|\beta_2|$. On the other hand, when the lateral acceleration data $\alpha y$ is greater than the second laeral acceleration threshold $\alpha y_2$, the front-left and front-right suspension control commands $V_{FL}$ and $V_{FR}$ are respectively maintained at the minimum and the maximum value $V_S$ and $V_M$.

Similarly, FIG. 11 shows characteristics of variation of rear-left and rear-right suspension control commands $V_{RL}$ and $V_{RR}$ having component according to variation of the lateral acceleration indicative signal value $g_y$. The suspension control commands $V_{RL}$ and $V_{RR}$ are derived according to the variation characteristics as shown in FIG. 10 and vary in relation to a neutral value $V_N$. Therefore, while no lateral acceleration is exerted on the vehicular body and thus the lateral acceleration indicative signal $g_y$ is maintained at the neutral value $X_{GN}$, both of the rear-left and rear-right control commands $V_{RL}$ and $V_{RR}$ are maintained at the neutral values $V_N$. Therefore, the pilot pressures in the pressure control valves 28 are maintained at the neutral pressure $P_N$ so that neutral pressure of the control pressure Pc can be supplied from the control port to the working chambers $26d$ of the hydraulic cylinders $26_{RL}$ and $26_{RR}$. As a result, the vehicular height level at orientations of the rear-left and rear-right suspension systems $14_{RL}$ and $14_{RR}$ can be maintained within a target height range defined in the vicinity of the target height.

On the other hand, when the vehicle steering operation is performed for turning left, right-hand lateral acceleration (centrifugal force) is induced. The magnitude of the right-hand lateral acceleration substantially corresponds to the rightward centrifugal force exerted on the vehiclular body, which right-hand lateral force causes right-hand vehicular rolling. As set forth, since the lateral acceleration sensor 102 is designed to produce the lateral acceleration indicative signal $g_y$ having a signal value greater than the neutral value $V_N$ in response to the right-hand lateral acceleration. Therefore, the lateral acceleration data value $\alpha y$ becomes positive value. In such case, the rear-right suspension control command $V_{RR}$ becomes greater value than the neutral value $V_N$ for harder suspension characteristics at the rear-right suspension system 14RR. On the other hand, the rear-left suspension control command $V_{RL}$ becomes smaller value than the neutral value $V_N$ for softer suspension characteristics at the front-left and rear-right suspension systems $14_{RL}$.

When the lateral acceleration data $\alpha y$ is greater than zero and smaller than or equal to a first lateral acceleration threshold $\alpha y$, e.g. 0.3 G, the rear-right suspension control command $V_{RR}$ is increased in a rate $\gamma_1$. On the other hand, the rear-left suspension control command $V_{RL}$ is decreased in a rate $-\gamma_3$. On the other hand, when the lateral acceleration data value $\alpha y$ is greater than $\alpha y_1$ but smaller than or equal to a second lateral acceleration threshold $\alpha y_2$, e.g. 0.5 G, the rear-right suspension control command $V_{RR}$ is increased toward a predetermined maximum value $V_M'$ in a rate $\gamma_2$ which is smaller than $\gamma_1$. On the other hand, the rear-left suspension control command $V_{RL}$ is decreased toward a predetermined minimum value $V_S'$ in a rate $-\gamma_4$ which is also smaller than $-\gamma_3$.

As can be seen, the absolute values of variation rate $|\gamma_3|$ and $|\gamma_1|$ are respectively greater thatn the absolute value of the variation rates $|\gamma_1|$ and $|\gamma_2|$. On the other hand, when the lateral acceleration data $\alpha y$ is greater than the second lateral acceleration threshold $\alpha y_2$, the rear-left and rear-right suspension control commands $V_{RL}$ and $V_{RR}$ are respectively maintained at the minimum and the maximum value $V_S'$ and $V_M'$. As can be seen, the maximum and minimum suspension control command values $V_M'$ and $V_S'$ are set at smaller value than the maximum and minimum values $V_M$ and $V_S$ of the front suspension control commands.

Figure 12:
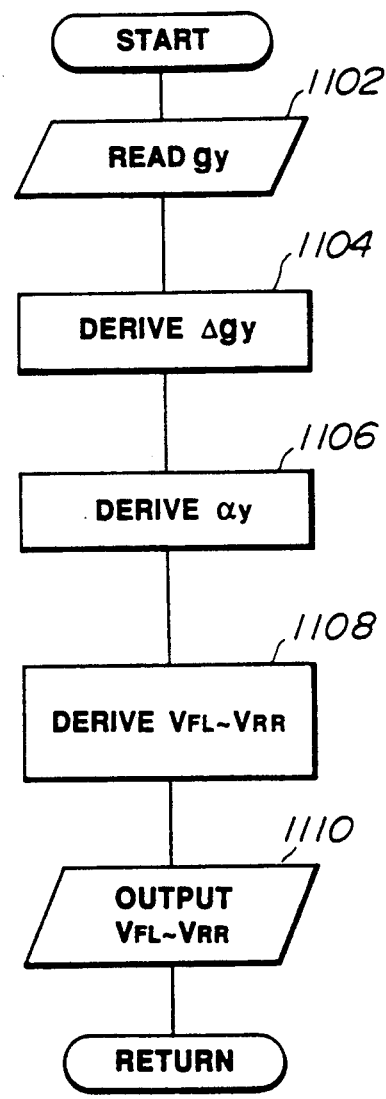
FIG. 12 is a flowchart of an anti-rolling suspension control to be executed by the suspension control system of FIG. 4.

The practical control operation to be taken place by the control unit 100 will be discussed with reference to FIG. 12, in which is shown a flowchart of an anti-rolling suspension control routine to be executed by the microprocessor 110. The shown routine is programmed as an interrupt routine to be executed at every given timing, e.g. every 20 msec.

Immediately after starting execution, the lateral acceleration indicative signal $g_y$ is read out, at a step 1102. From the read lateral acceleration indicative signal value $g_y$, a present neutral acceleration indicative value $Y_{GN}$ is subtracted to derive lateral acceleration indicative data. $\Delta g_y$ is derived at a step 1104. Then, on the basis of the lateral acceleration indicative data $\Delta g_y$, the lateral acceleration data $\alpha y$ is derived at a step 1106. In practice, the lateral acceleration data $\alpha y$ is set in the memory unit 116 in forms of look-up tables. Therefore, in the practical operation at the step 1106, is table look-up for deriving the lateral acceleration data $\alpha y$ in terms of the lateral acceleration indicative data $\Delta g_y$.

At step 1108, the anti-rolling front-left, front-right, rear-left and rear-right suspension control commands $V_{FL}$, $V_{FR}$, $V_{RL}$ and $V_{RR}$ are derived according to the variation characteristics as shown in FIGS. 10 and 11. Practically, the variation characteristics of the suspension control commands in relation to the lateral acceleration data $\alpha y$ is set in the memory unit 116 in a form of look-up table. Therefore, derivation of the front-left, front-right, rear-left and rear-right suspension control commands $V_{FL}$, $V_{FR}$, $V_{RL}$ and $V_{RR}$ is performed by table look-up. However, the shown embodiment takes the way of table look-up for deriving the suspension control command values, it may also be possible to obtain the equivalent command values by arithmetic process as a function of the lateral acceleration data $\alpha y$. Thereafter, at a step 1110, the front-left, front-right, rear-left and rear-right suspension control commands $V_{FL}$, $V_{FR}$, $V_{RL}$ and $V_{RR}$ are output to respectively corresponding driver circuits $122_{FL}$, $122_{FR}$, $122_{RL}$ and $122_{RR}$ via the D/A converters $120_{FL}$, $120_{FR}$, $120_{RL}$ and $120_{RR}$. The driver circuits $122_{FL}$, $122_{FR}$, $122_{RL}$ and $122_{RR}$ then outputs the suspension control signals $I_{FL}$, $I_{FR}$, $I_{RL}$ and $I_{RR}$ for adjusting pilot pressure at respective of the pressure control valves $28_{FL}$, $28_{FR}$, $28_{RL}$ and $28_{RR}$.

While the vehicle travels smooth straight road at constant speed, vehicular pitching will never induced. Therefore, the lateral acceleration indicative signal $g_y$ are maintained substantially the neutral values $Y_{GN}$. Therefore, the lateral acceleration data $\alpha y$ derived at the step 1106 in the foregoing routine are maintained substantially zero. Therefore, the anti-rolling suspension control comand values $V_{FL}$, $V_{FR}$, $V_{RL}$ and $V_{RR}$ are substantially maintained at the neutral command value $V_N$. Therefore, the suspension control signals $I_{FL}$, $I_{FR}$, $I_{RL}$ and $I_{RR}$ have the current value $I_N$ corresponding to the neutral pressure $P_N$.

On the other hand, when vehicular steering operation is performed for turning left, the positive value of the lateral acceleration $\alpha y$ is increased according to increasing of magnitude of deceleration. Therefore, the front-left and front-right suspension control command values $V_{FL}$ and $V_{FR}$ are derived according to the characteristics of FIG. 10, and the rear-left and rear-right suspension control command values $V_{RL}$ and $V_{RR}$ are derived according to the characteristics of FIG. 11. By this, the right side suspension systems 14FR and 14RR are hardened by increasing the fluid pressure in the working chamnbers $26d$ in the rear-left and rear-right hydraulic cylinders $26_{FR}$ and $26_{RR}$. On the other hand, the left side suspension systems $14_{FL}$ and $14_{RL}$ are softened by decreasing the fluid pressure in the working chambers $26d$ of the rear-left and rear-right hydraulic cylinders $26_{FL}$ and $26_{RL}$. Since the variation rate $\beta_1$, $\beta_2$ and $\gamma_1$, $\gamma_2$ are set at smaller values than $\beta_3$, $\beta_3$ and $\gamma_2$, $\gamma_4$, anti-rolling effect will be weakened for permitting permissible magnitude of vehicular rolling. At the same time, the vehicular body height may be lowered without causing substantial lift at the rear side of the vehicular body. Therefore, better vehicular brake feeling can be obtained.

The shown anti-rolling suspension control is futher advantageous in comparison with the prior proposed active suspension systems. Namely, in the prior proposed active suspension systems, the fluid pressure in the working chamber is maintained at a predetermined neutral pressure as long as the lateral and/or longitudinal acceleration exerted on the vehicular body is maintained at zero. When vehicle rolls, the fluid pressure at left and right suspension systems are adjusted by left and right suspension control commands having equal values but having opposite phases or polarities for hardening suspension systems oriented outside of the curve and softening suspension oriented inside of the curve. Similarly, when vehicular pitching is caused, front and rear suspension control commands having the equal value but opposite phases are supplied to the front and rear suspension system, for suppressing vehicular pitching motion magnitude. When acceleration greater than a predetermined maximum is exerted on the vehicular body, the fluid pressure in the working chamber is adjusted to a predetermined maximum and minimum level and maintained thereat. The predetermined maximum acceleration may be set depending upon the capacity of the hydraulic cylinder, acceptable magnitude of vehicular attitude change, desired critical level of cornering performance and so forth.

With such prior proposed active suspension system, vehicular attitude can be successfully regulated as long as the acceleration exerted on the vehicular body is maintained below the predetermined maximum level. On the other hand, when the acceleration becomes greater than maximum level, sudden change of vehicular attitude is caused to cause degradation of the riding comfort and driving stability. In view of this, it is desired that the active suspension system may prevent sudden attitude change ever at the occasion, on which acceleration greater than a predetermined maximum acceleration is exerted.

The shown embodiment realize this requirement by providing different variation rate at different acceleration magnitude range, so that vehicular rolling is permitted in an acceleration magnitude range in the vicinity of the critical magnitude in a controlled magnitude. This successfully avoid sudden change of the vehicular rolling magnitude when the lateral acceleration increased across the critical magnitude.

While the present invention has been discussed in terms of the preferred embodiment of the active suspension system, the invention can be embodied in various fashion. Therefore, the invention should be appreciated to include all possible embodiments and modifications which can be implemented without departing from the principle of the invention which is set out in the appended claims.

For instance, though the shown embodiment employs a lateral acceleration sensor for directly monitoring inertia moment exerted on the vehicular body, the equivalent parameter can be obtained by monitoring a vehicular speed and a steering angular position. Such a manner of detection of the laterally exerted inertia moment has been discussed in the Japanese Patent First (unexamined) Publication (Tokkai) Showa 62-293167. The disclosure of the above-identified Japanese publication is herein incorporated by reference. Furthermore, though the shown embodiment performs both of anti-rolling and anti-pitching suspension control, the invention is of course applicable for suspension system which performs either one of anti-rolling and anti-pitching control.

Also, the shown embodiment is directed to the control unit comprising a digital processor system for deriving the suspension control command. However, it is possible to formulate the equivalent control circuit by analog circuits. In the later case, the suspension control command may be derived by amplifying the lateral and/or longitudinal acceleration indicative signal with a predetermined amplifier gain. Furthermore, though the shown embodiment employs linear variation characteristics of the anit-rolling and anti-pitching components between the criteria, it may be possible to set two or more criteria for defining the variation characteristics of the anti-rolling and/or anti-pitching components. Further to say, the variation characteristics may be set in non-linear fashion, such as a curved characteristics. Therefore, concerning the variation characteristics, it is only essential matter for the present invention to reduce variation rate of the anti-rolling and/or anti-pitching components in greater acceleration range.

In addition, though the shown embodiment employs the same acceleration magnitude for setting the criteria for both of anti-rolling control and anti-pitching control, it is of course possible to employ mutually different acceleration magnitude for setting the criteria. Furthermore, though the shown embodiment has been concentrated to the hydraulic active suspension system, the algorithm of the invention may be applicable for various types of active suspension systems and also applicable even for passive suspension systems.

What is claimed is:

1. A suspension control system for an automotive vehicle, comprising:
    a plurality of suspension systems, each disposed between a vehicular body and a road wheel for damping relative displacement therebetween;
    damping characteristics adjusting means associated with each suspension system for controlling damping characteristics of the suspension system according to a suspension control command;
    sensor means for monitoring an inertia force experienced by the vehicular body and affecting a vehicular attitude, said sensor means producing a sensor signal representative of the monitored inertia force; and
    control means for performing a control operation on the basis of said sensor signal by deriving said suspension control command for regulating vehicular height within a predetermined standard height range and for regulating a vehicular attitude, said control means detecting a predetermined particular vehicle driving conditions on the basis of said sensor signal for switching control mode for adjusting the vehicular height at a lever lower than said standard height range with a controlled magnitude of vehicular attitude change.

2. A suspension control system as set forth in claim 1, wherein said control means derives a hardening control command for a suspension system at which relative displacement between said vehicular body and said road wheel is caused for reducing the relative distance between, and a softening suspension control command for suspension systems at which relative displacement between said vehicular body and said road wheel is caused for increasing the relative distance therebetween, said control means being responsive to said particular vehicle driving condition by reducing hardening magnitude for said hardening suspension control command and increasing softening magnitude for said softening suspension control command.

3. A suspension control system as set forth in claim 2, wherein said control means performs anti-pitching suspension control by lowering the vehicular height in response to longitudinally exerted inertia force.

4. A suspension control system as set forth in claim 3, wherein said control means is responsive to a backward inertial force exerted on the vehicular body by lowering the vehicular height below said standard height range.

5. A suspension control system as set forth in claim 2, wherein said control means performs anti-rolling suspension control by lowering the vehicular height in response to a laterally exerted inertia force.

6. A suspension control system as set forth in claim 5, wherein said control means varies a variation rate of said suspension control command versus a variation rate of a value of said sensor signal so that said variation rate is smaller at least in a sensor signal value range in the vicinity of first and second values which respectively represent inertia forces acting on the vehicle body in opposite directions.

7. A suspension control system as set forth in claim 6, wherein said sensor signal value is variable across said first and second values and further across a third value set between said first and second values, said third value corresponding to the vehicular state where the inertia force exerted on the vehicular body is zero, and said variation rate of said suspension control command in the sensor signal range in the vicinity of said third value is greater than said variation rate in the vicinity of said first and second values.

8. A suspension control system as set forth in claim 7, wherein said suspension control command varies according to a variation of said sensor signal value at a first variation rate in a sensor signal value range between said third value and a fourth value greater than said third value and smaller than said first value, and a second variation rate in a sensor signal value range between said fourth value and said first value.

9. A suspension control system as set forth in claim 8, wherein said suspension control command varies according to a variation of said sensor signal value at a third variation rate in a sensor signal value range between said third value and a fifth value smaller than said third value and greater than said second value, and a fourth variation rate in a sensor signal value range between said fifth value and said second value.

10. A suspension control system as set forth in claim 7, wherein said variation rate is continuously varied so that a greater variation rate is obtained in the vicinity of said third value and a smaller variation rate is obtained in the vicinity of said first and second values.

11. A suspension control system as set forth in claim 6, wherein said suspension control commands are provided for one side of the vehicular body for hardening suspension control and for the other side of the vehicular body for softening suspension control for regulating vehicular attitude, said sensor signal value being variable across said first and second values and further across a third value set between said first and second values and corresponding to a vehicular state where the inertia force exerted on the vehicular body is zero, and said variation rate of said hardening suspension control command the sensor signal range in a first sensor signal value range defined in the vicinity of said third value is greater than said variation rate in a second sensor signal value range defined in the vicinity of said first value, and said variation rate of said softening suspension control command in a third range defined in the vicinity of said third sensor signal value is greater than the variation rate in a fourth sensor signal value range defined in the vicinity of said second value.

12. A suspension control system as set forth in claim 11, wherein said fourth sensor signal value range is smaller than said second sensor signal value range.

13. A suspension control system as set forth in claim 1, wherein said damping characteristic adjusting means includes accumulators which absorb vibrations transmitted from a road surface to the road wheels for restricting corresponding vibration forces from being transmitted to the vehicle body.

14. A suspension control system for an automotive vehicle, comprising:
    suspension systems disposed between a vehicle body and suspension members which respectively support vehicle wheels rotatably, each of said suspension systems including a fluid cylinder containing a fluid at an adjustable pressure for active suspension control;
    a sensor operable to detect acceleration or deceleration experienced by the vehicle body which affects a vehicle attitude and to provide a corresponding signal indicative thereof;
    a power source unit which supplies said pressurized fluid to the fluid cylinder;

pressure control valves for adjusting pressure of the fluid supplied from said power source unit to the fluid cylinders; and control means for controlling said pressure control valves to regulate the vehicle attitude, said control means being responsive to the signal from said sensor to adjust vehicle height to a lever lower than a standard vehicle height when acceleration or deceleration are experienced by the vehicle body.

15. A suspension control system as set forth in claim 14, further comprising accumulators connected to each of the fluid cylinders respectively, said accumulators absorbing fluid vibrations in the respective fluid cylinders caused by vibrations transmitted from a road surface to the suspension members and thereby restricting the vibrations from being transmitted to the vehicle body.

16. A suspension control system as set forth in claim 14, wherein said control means is responsive to a signal from said sensor which indicates that no acceleration or deceleration is acting on the vehicle body to control said pressure control valves for regulating a vehicle height level within a preselected standard height range and in response to a signal which indicates acceleration or deceleration experienced by the vehicle body to control pressure control valves provided on a portion of the vehicle body higher than the standard vehicle height to lower said portion of the vehicle body at a first variation rate and to control pressure control valves provided on a portion of the vehicle body lower than the standard vehicle height to raise said portion of the vehicle body at a second variation rate lower than the first variation rate.

* * * * *